Oct. 21, 1930.                    E. MacCARRA                    1,779,179
                                 FRICTION CLUTCH
                              Filed Dec. 28, 1927
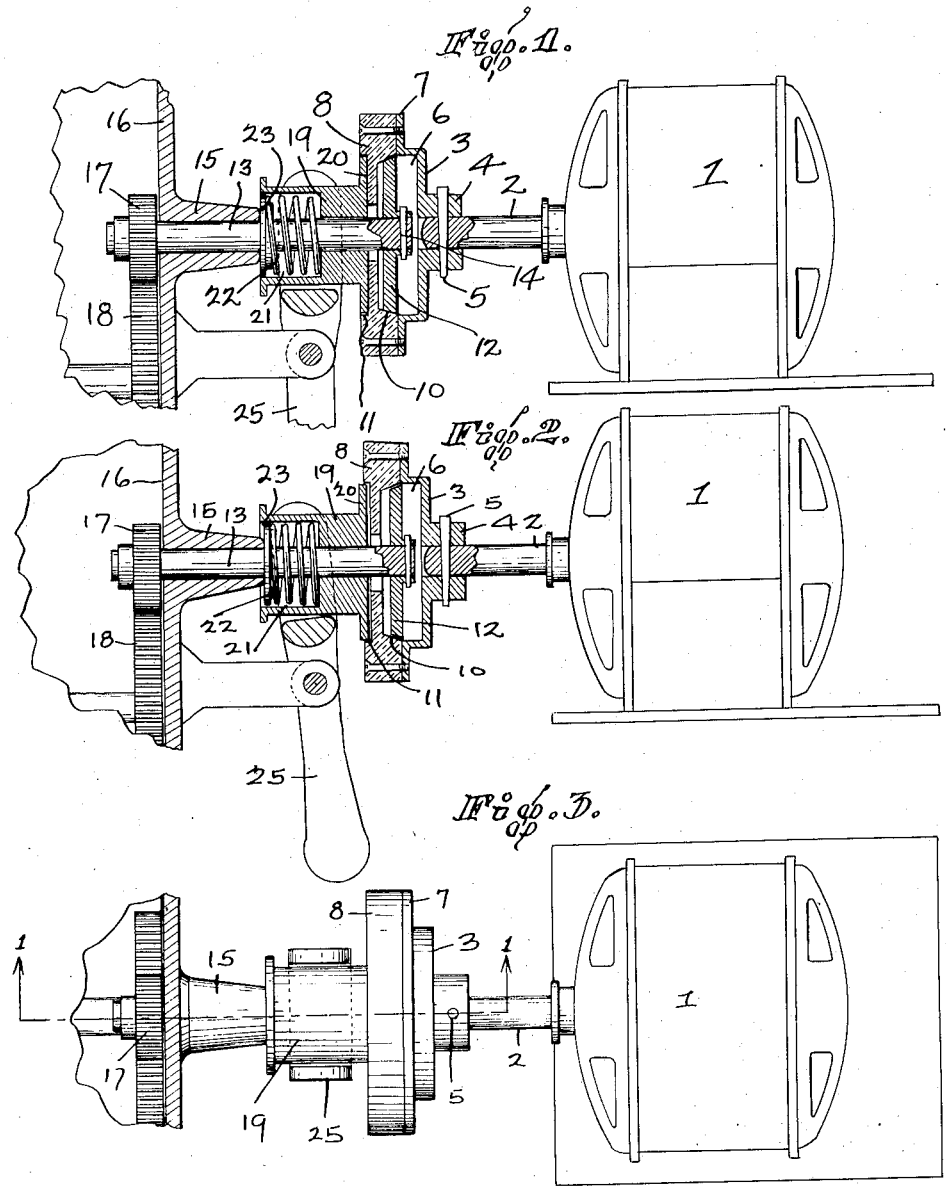
INVENTOR.
ERNEST MACCARRA
BY
ATTORNEYS.

Patented Oct. 21, 1930

1,779,179

UNITED STATES PATENT OFFICE

ERNEST MacCARRA, OF SAN FRANCISCO, CALIFORNIA

FRICTION CLUTCH

Application filed December 28, 1927. Serial No. 242,999.

This invention relates particularly to friction clutches.

An object of the invention is to provide a friction clutch, to be interposed between a prime mover and a point of use for the power delivered from said prime mover, which will not work against the motor to counteract the functioning thereof, and which may be readily declutched without the necessity of stopping the prime mover.

A further object of the invention is to provide a friction clutch for electric motors which will permit the mechanism driven by the motor to be declutched therefrom to bring said mechanism to an immediate stop, and a clutch which will "float" with the driving and driven shafts while engaged.

Other objects of the invention are to provide a friction clutch to connect the driving shaft of a motor with a driven shaft that will be superior in point of simplicity, inexpensiveness of construction, positiveness of operation, and facility and convenience in use and general efficiency.

In the specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying one sheet of drawings:

Fig. 1 is a longitudinal section through a clutch constructed in accordance with my invention, interposed between a driving motor and driven mechanism, taken on the line 1—1 of Fig. 3.

Fig. 2 is a longitudinal section similar to Fig. 1, showing the clutch in the disengaged position.

Fig. 3 is a plan view of the mechanism shown in Fig. 1.

In detail the construction illustrated in the drawings comprises an electric motor 1, or any other type of prime mover, having a driving shaft 2 extended therefrom. A housing plate 3, having a hub bearing 4 arranged concentrically thereon, is secured to the motor shaft 2 in axial alignment therewith, by means of a taper pin 5 which holds the said housing 3 in a predetermined position on the shaft. The inside face of the housing 3 is provided with an annular recess 6 therein, and a circumferential flange 7 projects outwardly from the periphery of the housing 3. The housing 3 is preferably formed out of metal in order to provide a durable structure.

A circular member 8 of substantially the same outer diameter as the flange 7, formed of fiber or leather, or some other compressible form of non-metallic material, is secured to the housing 3, and said member 8 is provided with an annular recess therein having an inwardly tapering annular wall 10. The opposite side of the member 8 is provided with an annular depression 11 therein. The member 8 having the tapered depression 10 therein functions as the female half of the clutch. A disc 12 having a tapered periphery thereon, that matches the inclination of the recess 10, is adapted to frictionally engage therewith, the disc 12 functioning as the male element of the clutch assembly. The disc 12 is preferably formed from metal.

A driven shaft 13 is pinned at 14 to the disc 12 in coaxial arrangement therewith and in axial alignment with the driving shaft 2. The shaft 13 extends through an opening that is provided centrally in the female member 8, and the free end of the shaft is journaled in a bearing 15 formed on the housing of the mechanism 16, that is to be driven by the motor 1. The end of the shaft 13, within the housing containing the mechanism to be driven, is provided with a gear 17 thereon that meshes with a gear 18 journaled in the housing. The particular mechanism within the housing 16 plays no particular part with the functioning of the invention, and I have merely illustrated sufficient mechanism to show one method of using the driving power from the motor 1.

A collared sleeve 19 is rotatably mounted on the shaft 13, one end of the collar 19 having a peripheral flange 20 thereon to frictionally engage the recess 11 in the outer face of the female clutch member 8. The interior of the opposite end of the sleeve 19 is recessed out as at 21, and an expansion spring 22 is confined within said recess. One end of the spring 22 bears against the bottom of the recess 21, while the opposite end of the spring bears against a collar 23 that is fixed on the shaft 13. The distance between the collar 23 and the male clutch disk 12 is a predetermined one, and the parts of the device are so fitted that the spring 22 normally will cause the sleeve 19 to urge the female clutch member 8 into engagement with the male clutch member 12. In the declutching or disengaging operation, the female clutch member 8 is allowed to move relative to the male clutch member 12, due to the fact that the driving shaft 2 of the motor has a sufficient amount of end play which can be utilized in the clutching and declutching action. The driving shaft 2 of the motor is disengaged from the driven shaft 13 through the clutch, by means of a manually actuated shifting lever 25 which engages the sleeve 19 to move the sleeve 19 axially on the shaft 13 to compress the spring 22, and to thereby free the said sleeve from the female clutch member 8, whereby said female clutch member 8 will have a slight axial movement, by reason of the end play in the motor shaft, to thereby disengage the female and male clutch members.

In Fig. 1, the clutch parts are shown in the clutched position, while in Fig. 2, the parts are shown in the declutched position. The clutch is self adjusting in that, as the said clutch wears through use, it automatically takes up the wear by reason of the end play of the shaft of the driving motor, permitting the device to maintain at all times a proper frictional engagement between the related elements.

I have particularly designed this clutch to eliminate any end thrust or end pressure on the motor or the mechanism, and the device as constructed, will "float" with the driving and driven shafts when in the engaged position allowing a limited oscillating or gyratory movement. The manner in which my clutch is constructed, also eliminates the necessity of lubrication on the clutching parts.

Having thus described this invention, what I claim and desire to secure by Letters Patent is:

1. A clutch comprised of a housing adapted to be connected to a prime mover, said housing having a concentrically arranged annular recess therein; an annular non-metal member secured concentrically on the housing, having an annular recess therein complementing the recess in the housing, the periphery of the recess in the member being tapered; a circular metal disk having a tapered periphery to engage the tapered recess in the non-metal member to be driven thereby; a driven co-axially arranged shaft on said disc and extended through the non-metal member; a sleeve on said shaft adapted to bear against a face of the non-metal member; a spring to urge said sleeve into engagement with the non-metal member; and to hold the non-metal driving member and metal disk in engagement; and means to move the sleeve on the shaft to declutch the driving and driven members.

2. In a clutch the combination of a driving shaft; a driven shaft in axial alignment therewith, the adjacent ends of said shafts being spaced from each other; a housing fixedly secured on said driving shaft, said driven shaft extending through said housing with freedom of movement relatively to said housing; a female member inside of said housing, facing the end of the driving shaft; a male clutch member fixed on the end of the driven shaft within the housing opposite said female member; resiliently urged means on the driven shaft, outside of the housing, for urging said female member into frictional engagement with the male member; and means to shift said resiliently urged means away from the housing into a declutching position.

3. In a clutch, the combination of a driving shaft, a driven shaft, the adjacent ends of the shafts being spaced from each other; a housing fixedly secured on the driving shaft, said driven shaft rotatably extending through said housing opposite the driving shaft; a non-metal female clutch member in said housing facing the driving shaft; a male clutch member fixed on the driven shaft within the housing in coacting relation with the female member, resiliently urged means on the driven shaft outside of the housing bearing against the housing and against the driven shaft so as to urge said female member of the housing into engagement with the male member; and means to shift said resiliently urged means away from and out of engagement with the housing thereby allowing the disengagement of the clutch members from each other.

4. In a clutch, the combination of a driving shaft, a driven shaft, the adjacent ends of the shafts being spaced from each other; a housing fixedly secured on the driving shaft, said driven shaft rotatably extending through said housing opposite the driving shaft; a compressible non-metal female clutch member in said housing facing the driving shaft; a metal male clutch member fixed on the driven shaft within the housing in coacting relation with the female member, resiliently urged means on the driven shaft outside of the housing bearing against the housing so as to urge said male and female members into frictional engagement with each other; and means to shift said resiliently urged means out of engagement with the housing thereby allowing the disengagement of the clutch members from each other.

5. In a clutch, the combination of a driving shaft, a driven shaft in axial alignment therewith, the adjacent ends of the shafts being spaced from each other; a rigid housing element fixed on the driving shaft, a compressible housing element secured to the rigid element, said compressible element having an aperture therein larger than the circumference of the driven shaft, said driven shaft extending through said aperture; said compressible element having a recess on the inside face thereof forming a female clutch member; a male clutch member complemental to said recess, being fixedly secured to said driven shaft within the housing; resiliently urged means on the driven shaft adapted to exert a pressure upon the outside face of the compressible housing element for urging said female and male clutch elements into frictional engagement with each other; and means to shift said resiliently urged means out of engagement with the compressible housing element.

6. In a clutch the combination of a driving shaft; a driven shaft in axial alignment with the driving shaft, the adjacent ends of the shafts being spaced from each other; a rigid housing element secured on the end of the driving shaft, a compressible, non-metal housing element secured to said rigid element, said compressible element having a central aperture therein for receiving said driven shaft therethrough with freedom of movement relative thereto; said compressible element having a concentric, annular tapered recess on the inside face thereof, a disk fixedly secured to the end of the driven shaft within said housing, said disk having an annular, tapered periphery complemental to said tapered recess; resiliently urged means slidable on the driven shaft for exerting a pressure on the outside face of the compressible housing element for urging said compressible element into frictional engagement with said disc; and means to shift said resiliently urged means out of engagement with said compressible element.

In testimony whereof, I have hereunto set my hand at San Francisco, California, this 13th day of December, 1927.

ERNEST MacCARRA.